US010181055B2

(12) United States Patent
Bolotin et al.

(10) Patent No.: US 10,181,055 B2
(45) Date of Patent: Jan. 15, 2019

(54) DATA SECURITY SYSTEM WITH ENCRYPTION

(71) Applicant: ClevX, LLC, Kirkland, WA (US)

(72) Inventors: Lev M. Bolotin, Kirkland, WA (US);
Alex Lemelev, Maple (CA); Marc Singer, Seattle, WA (US)

(73) Assignee: ClevX, LLC, Kirkland, WA (US)

( * ) Notice: Subject to any disclaimer, the term of this patent is extended or adjusted under 35 U.S.C. 154(b) by 152 days.

(21) Appl. No.: 14/987,749

(22) Filed: Jan. 4, 2016

(65) Prior Publication Data

US 2017/0017810 A1 Jan. 19, 2017

Related U.S. Application Data

(63) Continuation-in-part of application No. 12/680,742, filed as application No. PCT/US2008/077766 on Sep. 26, 2008, now Pat. No. 9,262,611.

(60) Provisional application No. 60/975,814, filed on Sep. 27, 2007.

(51) Int. Cl.
| | |
|---|---|
| *H04L 29/06* | (2006.01) |
| *G06F 21/78* | (2013.01) |
| *G06F 21/31* | (2013.01) |
| *H04W 12/06* | (2009.01) |

(52) U.S. Cl.
CPC .............. *G06F 21/78* (2013.01); *G06F 21/31* (2013.01); *H04L 63/083* (2013.01); *H04W 12/06* (2013.01)

(58) Field of Classification Search
CPC ........ G06F 21/78; G06F 21/31; H04W 12/06; H04L 63/083
See application file for complete search history.

(56) References Cited

U.S. PATENT DOCUMENTS

| | | | | |
|---|---|---|---|---|
| 6,529,949 | B1 * | 3/2003 | Getsin ..................... | G06F 21/10 380/202 |
| 6,795,421 | B1 * | 9/2004 | Heinonen ............. | H04W 88/08 370/338 |
| 6,845,398 | B1 * | 1/2005 | Galensky ............... | G06Q 20/32 709/203 |
| 6,975,202 | B1 * | 12/2005 | Rodriguez ......... | G07C 9/00103 340/10.1 |
| 7,069,447 | B1 | 6/2006 | Corder | |
| 7,089,424 | B1 * | 8/2006 | Subbiah .................. | G06F 21/85 380/278 |

(Continued)

FOREIGN PATENT DOCUMENTS

| | | |
|---|---|---|
| CN | 203502964 U | 3/2014 |
| CN | 103916537 A | 7/2014 |

(Continued)

OTHER PUBLICATIONS

"U.S. Appl. No. 12/680,742, Advisory Action dated Jan. 27, 2015", 3 pgs.

(Continued)

*Primary Examiner* — David Garcia Cervetti
(74) *Attorney, Agent, or Firm* — Schwegman Lundberg & Woessner, P.A.

(57) ABSTRACT

A data security system, and a method of operation thereof, includes a data security transceiver or receiver; an authentication subsystem operatively connected to the data security transceiver or receiver; and a storage subsystem connected to the authentication subsystem.

25 Claims, 13 Drawing Sheets

(56) References Cited

U.S. PATENT DOCUMENTS

| | | | |
|---|---|---|---|
| 7,437,145 B2* | 10/2008 | Hamada | H04L 63/08 455/410 |
| 7,600,130 B2 | 10/2009 | Ooi et al. | |
| 7,606,558 B2* | 10/2009 | Despain | G07C 9/00023 455/410 |
| 7,624,280 B2* | 11/2009 | Oskari | G06F 21/35 713/169 |
| 7,697,920 B1* | 4/2010 | McClain | G06F 21/43 455/410 |
| 7,734,293 B2* | 6/2010 | Zilliacus | H04W 36/0066 455/445 |
| 7,801,561 B2 | 9/2010 | Parikh et al. | |
| 7,925,895 B2 | 4/2011 | Kanazawa et al. | |
| 7,941,579 B2 | 5/2011 | Uno | |
| 7,979,054 B2* | 7/2011 | Baysinger | H04L 63/083 380/247 |
| 8,051,302 B1 | 11/2011 | Hatanaka et al. | |
| 8,058,971 B2* | 11/2011 | Harkins | G07C 9/00103 340/5.2 |
| 8,311,517 B2* | 11/2012 | Brass | B60R 25/24 307/10.5 |
| 8,639,873 B1* | 1/2014 | Jevans | G06F 21/31 711/104 |
| 8,683,550 B2* | 3/2014 | Hung | G06F 21/335 709/217 |
| 8,832,440 B2 | 9/2014 | Johnson et al. | |
| 8,988,187 B2 | 3/2015 | Wong et al. | |
| 9,075,571 B2 | 7/2015 | Bolotin et al. | |
| 9,208,242 B2* | 12/2015 | Kindberg | G06F 17/30879 |
| 9,262,611 B2 | 2/2016 | Johnson et al. | |
| 9,591,693 B2* | 3/2017 | Stroud | H04B 5/0031 |
| 9,813,416 B2 | 11/2017 | Bolotin et al. | |
| 9,893,892 B2* | 2/2018 | Priebatsch | G06F 21/31 |
| 9,960,916 B2* | 5/2018 | Corndorf | H04L 9/0631 |
| 2002/0082917 A1 | 6/2002 | Takano | |
| 2002/0094777 A1* | 7/2002 | Cannon | H04L 63/107 455/41.2 |
| 2002/0099661 A1* | 7/2002 | Kii | G06Q 30/06 705/51 |
| 2002/0147525 A1* | 10/2002 | Cayne | G07C 9/00087 700/214 |
| 2002/0176385 A1* | 11/2002 | Huh | H04B 1/715 370/335 |
| 2002/0179622 A1* | 12/2002 | Mase | E05B 19/0005 221/9 |
| 2002/0194476 A1 | 12/2002 | Lewis et al. | |
| 2003/0046593 A1* | 3/2003 | Xie | G06F 21/80 726/33 |
| 2003/0093693 A1* | 5/2003 | Blight | H04L 63/08 726/4 |
| 2003/0106935 A1* | 6/2003 | Burchette, Jr. | G06Q 20/341 235/380 |
| 2003/0191955 A1 | 10/2003 | Wagner et al. | |
| 2003/0212607 A1 | 11/2003 | Chu et al. | |
| 2003/0226025 A1 | 12/2003 | Lin et al. | |
| 2004/0023642 A1* | 2/2004 | Tezuka | H04L 63/0823 455/411 |
| 2004/0044897 A1 | 3/2004 | Lim | |
| 2004/0078568 A1* | 4/2004 | Pham | G06F 21/6218 713/165 |
| 2004/0097217 A1* | 5/2004 | McClain | H04L 63/083 455/411 |
| 2004/0103288 A1* | 5/2004 | Ziv | G06F 12/1466 713/185 |
| 2004/0106433 A1* | 6/2004 | Ooki | H04M 15/49 455/561 |
| 2004/0122907 A1* | 6/2004 | Chou | H04L 63/0281 709/207 |
| 2004/0172538 A1 | 9/2004 | Satoh et al. | |
| 2004/0236918 A1* | 11/2004 | Okaue | G06F 12/1466 711/164 |
| 2004/0236919 A1* | 11/2004 | Okaue | G06F 12/1441 711/164 |
| 2005/0114689 A1 | 5/2005 | Strom et al. | |
| 2005/0210271 A1* | 9/2005 | Chou | G06F 21/32 713/186 |
| 2005/0270139 A1 | 12/2005 | Park et al. | |
| 2005/0288060 A1* | 12/2005 | Kojima | H04W 88/085 455/561 |
| 2006/0005023 A1* | 1/2006 | Homer | G06F 21/32 713/168 |
| 2006/0048236 A1* | 3/2006 | Multerer | G06F 21/121 726/28 |
| 2006/0063590 A1* | 3/2006 | Abassi | A63F 13/12 463/29 |
| 2006/0085847 A1* | 4/2006 | Ikeuchi | G06F 21/35 726/6 |
| 2006/0123056 A1* | 6/2006 | Darbha | G06F 21/31 |
| 2006/0128305 A1* | 6/2006 | Delalat | G08B 13/1418 455/41.2 |
| 2006/0170533 A1* | 8/2006 | Chioiu | G07C 9/00103 340/5.61 |
| 2006/0200681 A1* | 9/2006 | Kato | G06F 21/34 713/193 |
| 2006/0206709 A1* | 9/2006 | Labrou | G06Q 20/18 713/167 |
| 2006/0206720 A1* | 9/2006 | Harada | H04L 63/02 713/182 |
| 2006/0236105 A1* | 10/2006 | Brok | H04W 12/06 713/169 |
| 2006/0236363 A1* | 10/2006 | Heard | H04L 63/101 726/1 |
| 2006/0265605 A1* | 11/2006 | Ramezani | G06F 21/78 713/193 |
| 2006/0271789 A1* | 11/2006 | Satomura | G06F 21/41 713/183 |
| 2007/0016743 A1* | 1/2007 | Jevans | G06F 21/31 711/164 |
| 2007/0050622 A1* | 3/2007 | Rager | G06F 21/445 713/168 |
| 2007/0050643 A1 | 3/2007 | Negishi | |
| 2007/0053308 A1* | 3/2007 | DuMas | H04L 45/00 370/254 |
| 2007/0073937 A1* | 3/2007 | Feinberg | G06F 9/445 710/62 |
| 2007/0149170 A1* | 6/2007 | Bloebaum | H04L 63/0853 455/411 |
| 2007/0162963 A1* | 7/2007 | Penet | G06F 21/41 726/5 |
| 2007/0191057 A1* | 8/2007 | Kamada | H04M 1/274516 455/558 |
| 2007/0192601 A1 | 8/2007 | Spain et al. | |
| 2007/0198856 A1 | 8/2007 | Lee et al. | |
| 2007/0203618 A1* | 8/2007 | McBride | B60R 25/24 701/2 |
| 2007/0239994 A1 | 10/2007 | Kulkarni et al. | |
| 2007/0255962 A1 | 11/2007 | Lu et al. | |
| 2007/0294746 A1* | 12/2007 | Sasakura | B60R 25/2018 726/2 |
| 2008/0005577 A1* | 1/2008 | Rager | G06F 21/575 713/183 |
| 2008/0006685 A1* | 1/2008 | Rackley, III | G06Q 20/10 235/379 |
| 2008/0010190 A1* | 1/2008 | Rackley, III | G06Q 20/042 705/39 |
| 2008/0010191 A1* | 1/2008 | Rackley, III | G06Q 20/042 705/39 |
| 2008/0010192 A1* | 1/2008 | Rackley, III | G06Q 20/042 705/39 |
| 2008/0010193 A1* | 1/2008 | Rackley, III | G06Q 20/042 705/39 |
| 2008/0010196 A1* | 1/2008 | Rackley, III | G06Q 20/102 705/40 |
| 2008/0010204 A1* | 1/2008 | Rackley, III | G06Q 20/042 705/45 |
| 2008/0010215 A1* | 1/2008 | Rackley, III | G06Q 20/042 705/70 |
| 2008/0017711 A1* | 1/2008 | Adams | G06K 7/0008 235/439 |

(56) References Cited

U.S. PATENT DOCUMENTS

| | | | |
|---|---|---|---|
| 2008/0022043 A1* | 1/2008 | Adams | G06K 7/0008 711/115 |
| 2008/0039134 A1* | 2/2008 | Hattori | G06F 12/1458 455/556.1 |
| 2008/0040265 A1* | 2/2008 | Rackley, III | G06Q 20/02 705/40 |
| 2008/0041951 A1* | 2/2008 | Adams | G07F 7/0806 235/435 |
| 2008/0045177 A1* | 2/2008 | Wise | H04W 8/245 455/403 |
| 2008/0055041 A1* | 3/2008 | Takene | G07C 9/00111 340/5.7 |
| 2008/0114855 A1* | 5/2008 | Welingkar | G06Q 20/12 709/217 |
| 2008/0115141 A1* | 5/2008 | Welingkar | G06F 9/5011 718/104 |
| 2008/0115152 A1* | 5/2008 | Welingkar | G06F 17/30575 719/322 |
| 2008/0115226 A1* | 5/2008 | Welingkar | G06F 21/88 726/28 |
| 2008/0120726 A1* | 5/2008 | Tsunehiro | G06F 21/77 726/27 |
| 2008/0120729 A1* | 5/2008 | Eren | G06F 21/34 726/34 |
| 2008/0126145 A1* | 5/2008 | Rackley, III | G06Q 20/102 455/406 |
| 2008/0151847 A1* | 6/2008 | Abujbara | H04L 63/0892 370/338 |
| 2008/0177860 A1* | 7/2008 | Khedouri | G06F 17/30038 709/217 |
| 2008/0212771 A1 | 9/2008 | Hauser | |
| 2008/0214215 A1* | 9/2008 | Aaltonen | G06F 17/30905 455/466 |
| 2008/0215841 A1* | 9/2008 | Bolotin | G06F 1/1632 711/164 |
| 2008/0216153 A1* | 9/2008 | Aaltonen | G06F 21/31 726/3 |
| 2008/0267404 A1 | 10/2008 | Budde et al. | |
| 2008/0313082 A1* | 12/2008 | Van Bosch | G06Q 20/02 705/50 |
| 2009/0037748 A1 | 2/2009 | Kim et al. | |
| 2009/0054104 A1* | 2/2009 | Borean | H04L 63/0853 455/558 |
| 2009/0063802 A1* | 3/2009 | Johnson | G06F 21/31 711/164 |
| 2009/0097719 A1 | 4/2009 | Lim | |
| 2009/0119754 A1* | 5/2009 | Schubert | H04L 63/0853 726/4 |
| 2010/0015942 A1* | 1/2010 | Huang | H04M 1/66 455/404.1 |
| 2010/0031336 A1* | 2/2010 | Dumont | G06F 21/32 726/9 |
| 2010/0135491 A1* | 6/2010 | Bhuyan | H04L 63/0869 380/247 |
| 2010/0250937 A1* | 9/2010 | Blomquist | H04L 9/14 713/170 |
| 2010/0274859 A1* | 10/2010 | Bucuk | H04L 63/08 709/206 |
| 2010/0287373 A1 | 11/2010 | Johnson et al. | |
| 2011/0060921 A1 | 3/2011 | Michael | |
| 2011/0313922 A1 | 12/2011 | Ben Ayed | |
| 2013/0174252 A1 | 7/2013 | Weber et al. | |
| 2015/0058624 A1 | 2/2015 | Borisov et al. | |
| 2016/0119339 A1 | 4/2016 | Bolotin et al. | |
| 2016/0259736 A1 | 9/2016 | Bolotin et al. | |
| 2017/0075636 A1* | 3/2017 | Chang | G06F 3/1245 |
| 2017/0214528 A1* | 7/2017 | Priebatsch | G06F 21/31 |

FOREIGN PATENT DOCUMENTS

| | | |
|---|---|---|
| KR | 20010106325 A | 11/2001 |
| KR | 102001010632 A | 11/2001 |
| KR | 20050023050 A | 3/2005 |
| KR | 102005002305 A | 3/2005 |
| TW | 537732 B | 6/2016 |
| WO | WO-2009042820 | 4/2009 |
| WO | WO-2017123433 A1 | 7/2017 |

OTHER PUBLICATIONS

"U.S. Appl. No. 12/680,742, Advisory Action dated Dec. 19, 2013", 3 pgs.

"U.S. Appl. No. 12/680,742, Final Office Action dated Sep. 27, 2013", 13 pgs.

"U.S. Appl. No. 12/680,742, Final Office Action dated Oct. 28, 2014", 16 pgs.

"U.S. Appl. No. 12/680,742, Non Final Office Action dated Mar. 12, 2013", 12 pgs.

"U.S. Appl. No. 12/680,742, Non Final Office Action dated Mar. 27, 2015", 15 pgs.

"U.S. Appl. No. 12/680,742, Non Final Office Action dated Apr. 7, 2014", 14 pgs.

"U.S. Appl. No. 12/680,742, Notice of Allowance dated Oct. 1, 2015", 8 pgs.

"U.S. Appl. No. 12/680,742, Preliminary Amendment filed Jun. 5, 2012", 2 pgs.

"U.S. Appl. No. 12/680,742, Response filed Jun. 12, 2013 to Non Final Office Action dated Mar. 12, 2013", 16 pgs.

"U.S. Appl. No. 12/680,742, Response filed Jun. 29, 2015 to Non Final Office Action dated Mar. 27, 2015", 14 pgs.

"U.S. Appl. No. 12/680,742, Response filed Jul. 7, 2014 to Non Final Office Action dated Apr. 7, 2014", 20 pgs.

"U.S. Appl. No. 12/680,742, Response filed Nov. 27, 2013 to Final Office Action dated Sep. 27, 2013", 15 pgs.

"U.S. Appl. No. 12/680,742, Response filed Dec. 29, 2014 to Final Office Action dated Oct. 28, 2014", 16 pgs.

"U.S. Appl. No. 14/987,678, Non Final Office Action dated Feb. 10, 2017", 11 pgs.

"International Application Serial No. PCT/US2008/077766, International Preliminary Report on Patentability dated Mar. 30, 2010", 8 pgs.

"International Application Serial No. PCT/US2008/077766, International Search Report dated Mar. 31, 2009", 3 pgs.

"International Application Serial No. PCT/US2008/077766, Written Opinion dated Mar. 31, 2009", 7 pgs.

"International Application Serial No. PCT/US2017/012060, International Search Report dated Mar. 27, 2017", 2 pgs.

"International Application Serial No. PCT/US2017/012060, Written Opinion dated Mar. 27, 2017", 6 pgs.

"U.S. Appl. No. 14/987,678, 312 Amendment filed Sep. 5, 2017", 3 pgs.

"U.S. Appl. No. 14/987,678, Notice of Allowance dated Aug. 10, 2017", 9 pgs.

"U.S. Appl. No. 14/987,678, PTO Response to Rule 312 Communication dated Sep. 11, 2017", 2 pgs.

"U.S. Appl. No. 14/987,678, Response filed Jun. 21, 2017 to Non Final Office Action dated Feb. 10, 2017", 9 pgs.

\* cited by examiner

DATA SECURITY SYSTEM WITH ENCRYPTION

CROSS-REFERENCE TO RELATED APPLICATION(S)

This is a continuation-in-part of copending U.S. patent application Ser. No. 12/680,742 filed Mar. 29, 2010, which is the National Stage of International Application number PCT/US2008/077766 filed Sep. 26, 2008, which claims the benefit of U.S. Provisional Patent Application Ser. No. 60/975,814 filed Sep. 27, 2007, and the subject matter thereof is incorporated herein by reference thereto.

The present application contains subject matter related to a concurrently filed U.S. patent application Ser. No. 14/987,678, filed Jan. 4, 2016, by Lev M. Bolotin and Simon B. Johnson and entitled "DATA SECURITY SYSTEM WITH ENCRYPTION". The subject matter thereof is incorporated herein by reference thereto.

TECHNICAL FIELD

The present invention relates generally to electronic devices, and more particularly to memory devices.

BACKGROUND ART

Security is a critical issue with almost all aspects of computer use. Storage media, such as hard disk drives attached to computers, contain valuable information, which is vulnerable to data theft. A great deal of money and effort is being applied to guarding personal, corporate, and government security information.

As portable memory storage devices have become smaller, easier to lose, more ubiquitous, cheaper, and larger in memory capacity, they have come to pose extraordinary security problems. It is now possible to download massive amounts of information surreptitiously into portable memory storage devices, such as universal serial bus flash and micro drives, cellphones, camcorders, digital cameras, iPODs, MP3/4 players, smart phones, palm and laptop computers, gaming equipment, authenticators, tokens (containing memory), etc.—in general, a mass storage device (MSD).

More specifically, there are millions of MSDs being used for backup, transfer, intermediate storage, and primary storage into which information can be easily downloaded from a computer and carried away. The primary purpose of any MSD is to store and retrieve "portable content," which is data and information tied to a particular owner not a particular computer.

The most common means of providing storage security is to authenticate the user with a computer-entered password. A password is validated against a MSD stored value. If a match occurs, the drive will open. Or, the password itself is used as the encryption key to encrypt/decrypt data stored to the MSD.

For drives that support on-the-fly encryption, the encryption key is often stored on the media in an encrypted form. Since the encryption key is stored on the media, it becomes readily available to those willing to circumvent the standard interface and read the media directly. Thus, a password is used as the key to encrypt the encryption key.

For self-authenticating drives, their authentication subsystem is responsible for maintaining security. There is no dependency on a host computer to which it is connected. Thus, a password cannot (or need not) be sent from the host in order to unlock the MSD. In fact, the encryption key no longer needs to be stored on the media. The authentication subsystem becomes the means for managing encryption keys.

Thus, a need still remains for improved security. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a data security system including: providing a mobile device with a data security system application for connectivity with the data security system; starting the data security system application; and maintaining connectivity of the data security system with the mobile device.

The present invention provides a data security system including: a data security transceiver or receiver; an authentication subsystem operatively connected to the data security transceiver or receiver; and a storage subsystem connected to the authentication subsystem.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
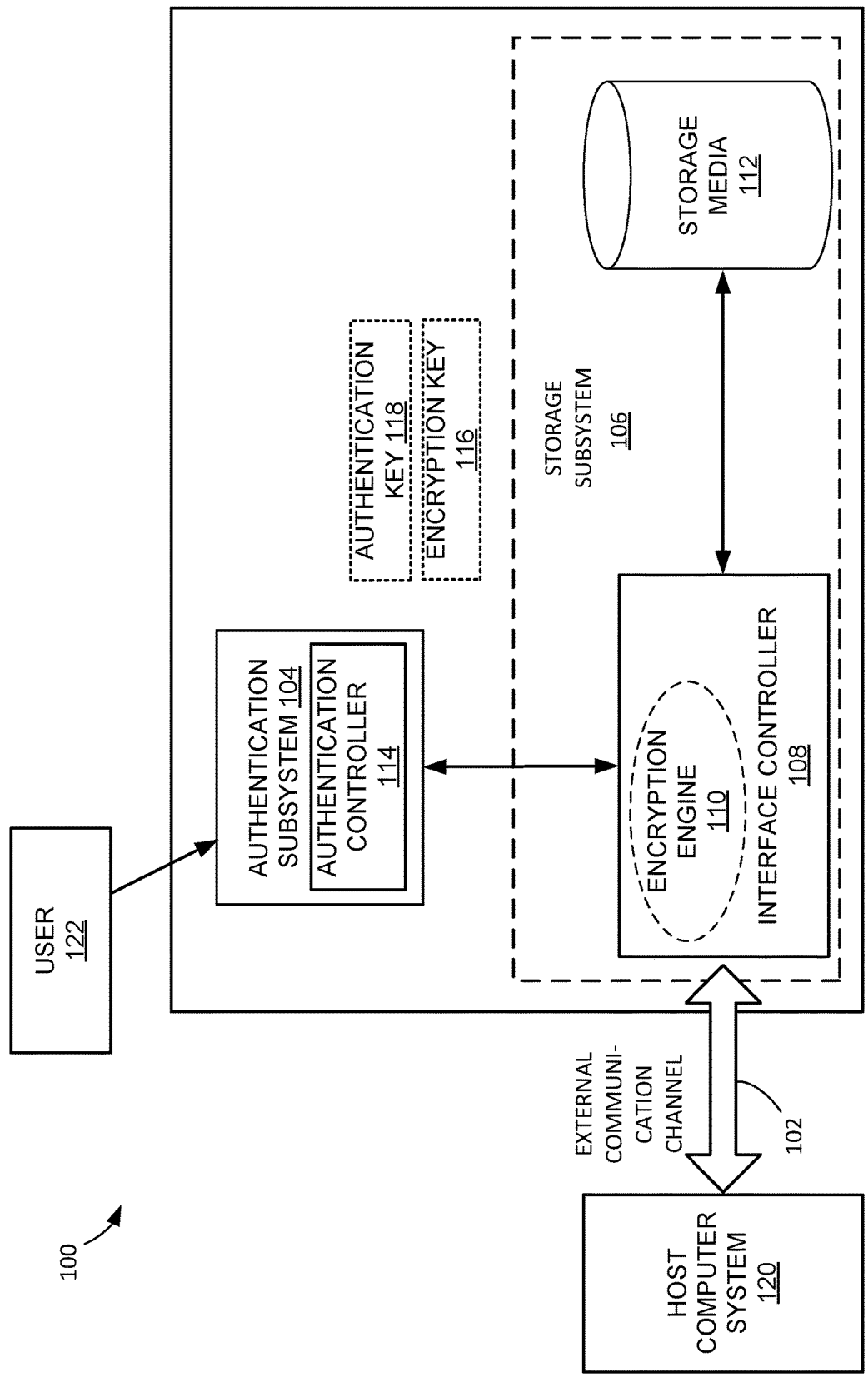
FIG. 1 is a schematic of a data security system in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown exaggerated in the drawing FIGs. Where multiple embodiments are disclosed and described having some features in common, for clarity and ease of illustration, description, and comprehension thereof, similar and like features one to another will ordinarily be described with similar or the same reference numerals. Similarly, although the views in the drawings for ease of description generally show similar orientations, this depiction in the FIGs. is arbitrary for the most part. Generally, the invention can be operated in any orientation.

The term "system" as used herein refers to and is defined as the method and as the apparatus of the present invention in accordance with the context in which the term is used. The term "method" as used herein refers to and is defined as the operational steps of an apparatus.

For reasons of convenience and not limitation, the term "data" is defined as information that is capable of being produced by or stored in a computer. The term "data security system" is defined as meaning any portable memory device incorporating a storage medium. The term "storage media" as used herein refers to and is defined as any solid state, NAND Flash, and/or magnetic data recording system. The term "locked" refers to the data security system when the storage media is not accessible and the term "unlocked" refers to the data security system when the storage media is accessible.

There are generally two methods to make a storage device tamper resistant:
1. Apply epoxy to components—an epoxy resin applied to the printed circuit board can make it difficult to disassemble the storage device without destroying storage media.
2. Encrypt memory data—data gets encrypted as it is written to the storage media and an encryption key is required to decipher the data.

Referring now to FIG. 1, therein is shown a schematic of a data security system 100 in accordance with an embodiment of the present invention. The data security system 100 consists of an external communication channel 102, an authentication subsystem 104, and a storage subsystem 106.

The storage subsystem 106 is electronic circuitry that includes an interface controller 108, an encryption engine 110, and a storage media 112. The storage media 112 can be an internal or external hard disk drive, USB flash drive, solid state drive, hybrid drive, memory card, tape cartridge, and optical media including optical disk (e.g., Blu-ray disk, digital versatile disk or DVD, and compact disk or CD). The storage media 112 can include a data protection appliance, archival storage system, and cloud-based data storage system. The cloud storage system may be accessed utilizing a plug-in (or "plugin") application or extension software installed in a browser application, either on the host computer or on another system coupled to the host computer via a wired or wireless network, such as RF or optical, or over the world wide web.

The interface controller 108 includes electronic components such as a micro-controller with the encryption engine 110 of software or hardware, although the encryption engine 110 can be in a separate controller in the storage subsystem 106.

The authentication subsystem 104 is electronic circuitry that includes an authentication controller 114, such as a micro-controller, which may have its own non-volatile memory, such as an electrically erasable programmable read-only memory (EEPROM).

The external communication channel 102 provides a means of exchanging data with a host computer system 120. Universal Serial Bus (USB) is one of the most popular means to connect the data security system 100 to the host computer system 120. Other examples of the external communication channel 102 include Firewire, wireless USB, Serial ATA (SATA), High Definition Multimedia Interface (HDMI), Recommended Standard 232 (RS-232), and radio frequency wireless networks.

The interface controller 108 is capable of translating USB packet data to data that can be written to the storage media 112 in a USB Flash Drive.

The encryption engine 110 is implemented as part of the interface controller 108 and takes clear text and/or data (information) from the host computer system 120 and converts it to an encrypted form that is written to the MSD or the storage media 112. The encryption engine 110 also converts encrypted information from the storage media 112 and decrypts it to clear information for the host computer system 120. The encryption engine 110 can also be a two controller subsystem with an encryption controller that has the encryption capability to encrypt/decrypt data on the fly along with managing the communication protocol, memory, and other operating conditions and a communication/security controller for handling the communication, encryption key management, and communications with the encryption controller.

An encryption key 116 is required by the encryption engine 110 to encrypt/decrypt the information. The encryption key 116 is used in an algorithm (e.g., a 256 bit Advanced Encryption Standard (AES) encryption) that respectively encrypts/decrypts the data by an encryption algorithm to render data unreadable or readable. The encryption key 116 can be stored either internally or externally to the authentication controller 114.

The encryption key 116 is transmitted to the encryption engine 110 by the authentication subsystem 104 once a user 122, having an identification number or key, has been verified against an authentication key 118.

It has been discovered that, by the employment of the authentication key 118 and the encryption key 116, portable memory storage devices of the various embodiments of the present invention can be provide an extremely high level of security previously not available in such devices.

When the data security system 100 is locked, the authentication key 118 remains inside the authentication subsystem 104 and cannot be read from outside. One method of hiding the authentication key 118 is to store it in the authentication controller 114 in the authentication subsystem 104. Setting the security fuse of the authentication controller 114 makes it impossible to access the authentication key 118 unless the authentication controller 114 allows retrieval once the user 122 has been verified. Many micro-controllers come equipped with a security fuse that prevents accessing any internal memory when blown. This is a well-known and widely used security feature. Such a micro-controller could be used for the authentication controller 114. The authentication controller 114 can be a micro-controller or microprocessor.

The authentication key 118 can be used as in several capacities:

1. As the encryption key 116 to encrypt/decrypt the information directly.
2. As a key to recover the encryption key 116 stored in the data security system 100 that can be accessed by the interface controller 108.
3. Used for direct comparison by the interface controller 108 to activate the external communication channel 102.

Figure 2:
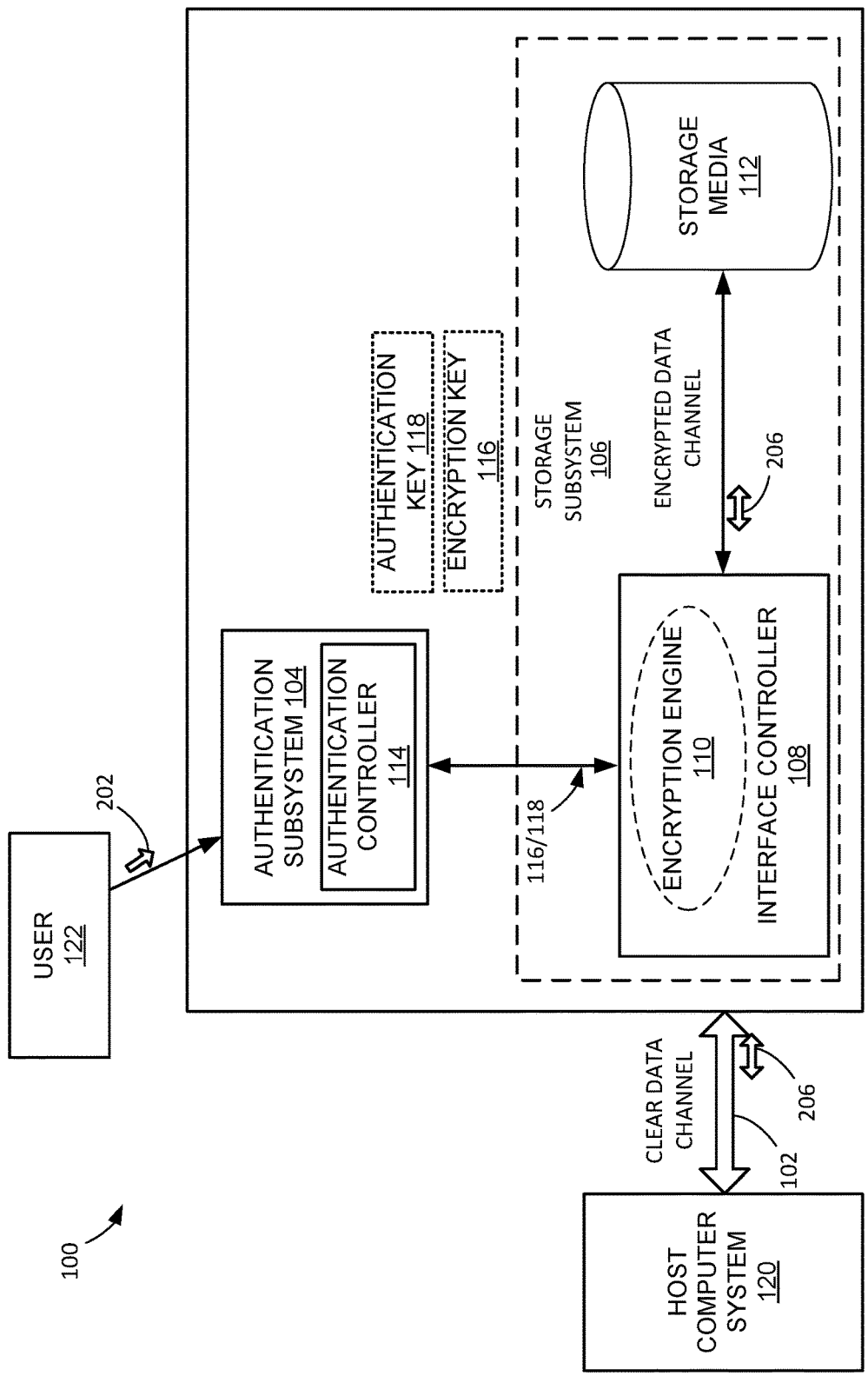
FIG. 2 is an illustration of an authentication key delivery method used with the data security system.

Referring now to FIG. 2, therein is shown an illustration of an authentication key delivery method used with the data security system 100. In this illustration, the authentication key 118 and the encryption key 116 are one and the same. The encryption engine 110 employs the authentication key 118 as the encryption key 116.

The user 122 must interact with the authentication subsystem 104 by providing user identification 202, a number or key, to the authentication subsystem 104. The authentication subsystem 104 validates the user 122 against the authentication key 118. The authentication subsystem 104 then transmits the authentication key 118 as the encryption key 116 to the interface controller 108.

The encryption engine 110 in the interface controller 108 employs the authentication key 118 to convert clear information to encrypted information and encrypted information to clear information along a channel 206. Any attempt to read encrypted information from the storage media 112 without the encryption key 116 will generally result in information that is unusable by any computer.

Figure 3:
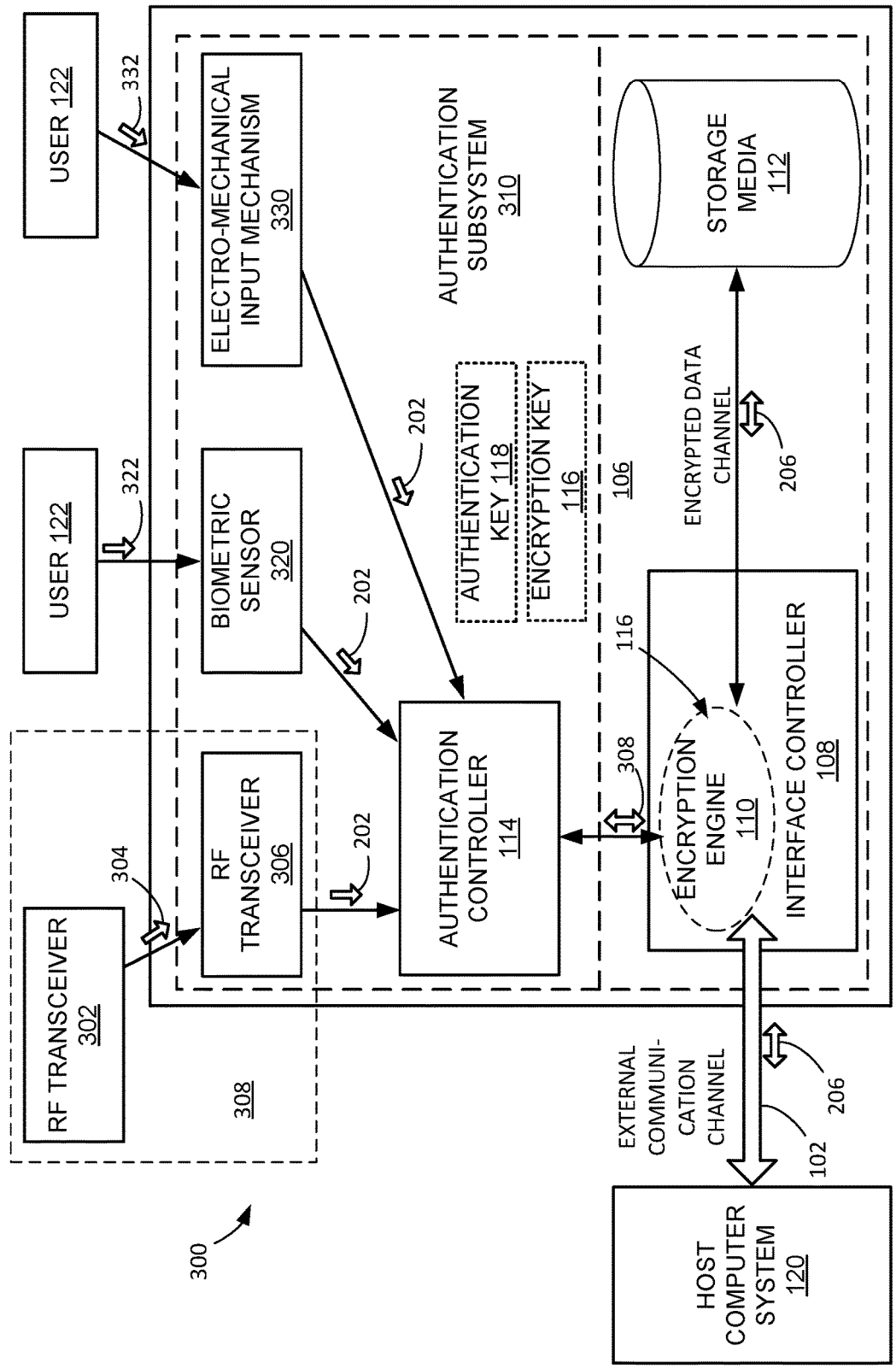
FIG. 3 is an illustration of different systems for the user to interact with the data security system.

Referring now to FIG. 3, therein is shown an illustration of different systems for the user 122 to interact with a data security system 300. The interaction can be by a communication combination 301, which can be by a physical contact, wired connection, or wireless connection from a cell phone, smartphone, smart watch, wearable appliance, or other wireless device.

In one authentication system, a mobile transceiver 302 is employed to transmit user identification 304 to a data security transceiver 306 in an authentication subsystem 310. For exemplary purposes, transceivers are employed for bi-directional communication flexibility but a transmitter-receiver combination for uni-directional communication could also be used. The authentication subsystem 310 includes the authentication controller 114, which is connected to the interface controller 108 in the storage subsystem 106. The user identification 304 is supplied to the data security transceiver 306 within the authentication subsystem 310 by the mobile transceiver 302 from outside the storage subsystem 106 of the data security system 300. The wireless communication may include Wireless Fidelity (WiFi), Bluetooth (BT), Bluetooth Smart, Near Field Communication (NFC), Global Positioning System (GPS), optical, cellular communication (for example, Long-Term Evolution (LTE), Long-Term Evolution Advanced (LTE-A)), Code Division Multiple Access (CDMA), Wideband Code Division Multiple Access (WCDMA), Universal Mobile Telecommunications System (UMTS), Wireless Broadband (WiBro), or Global System for Mobile Communications (GSM), and the like).

The authentication subsystem 310 validates the user 122 against the authentication key 118 by a code sent from the mobile transceiver 302 being validated against the authentication key 118. The authentication subsystem 310 then transmits the encryption key 116 to the interface controller 108 across the communication combination 301.

The encryption engine 110 then employs the encryption key 116 to convert clear information to encrypted information and encrypted information to clear information along the channel 206. Any attempt to read encrypted information from the storage media 112 without the encryption key 116 will result in information that is unusable by the host computer system 120.

In an optional second authentication mechanism, the authentication subsystem 310 validates the user 122 against the authentication key 118 by having the user 122 employ a biometric sensor 320 to supply a biometric input 322 to verify his/her identity as an authorized user. Types of biometric identification include a fingerprint, an iris scan, a voice imprint, etc.

In an optional third authentication mechanism, The authentication subsystem 310 validates the user 122 against the authentication key 118 by having the user 122 employ an electro-mechanical input mechanism 330 to supply a unique code 332 to verify his/her identity as an authorized user. The unique code 332 can include a numerical, alphanumeric, or alphabetic code, such as a PIN. The electro-mechanical input mechanism 330 is within the authentication subsystem 310. The electro-mechanical input mechanism 330 receives the unique code 332 from the user 122 from outside of the data security system 300. The unique code 332 is supplied to the electro-mechanical input mechanism 330 within the authentication subsystem 310 from outside the storage subsystem 106 of the data security system 300.

No matter which method is used to validate the user 122, the authentication key 118 and the encryption key 116 remain hidden until the user 122 is authenticated.

Figure 4:
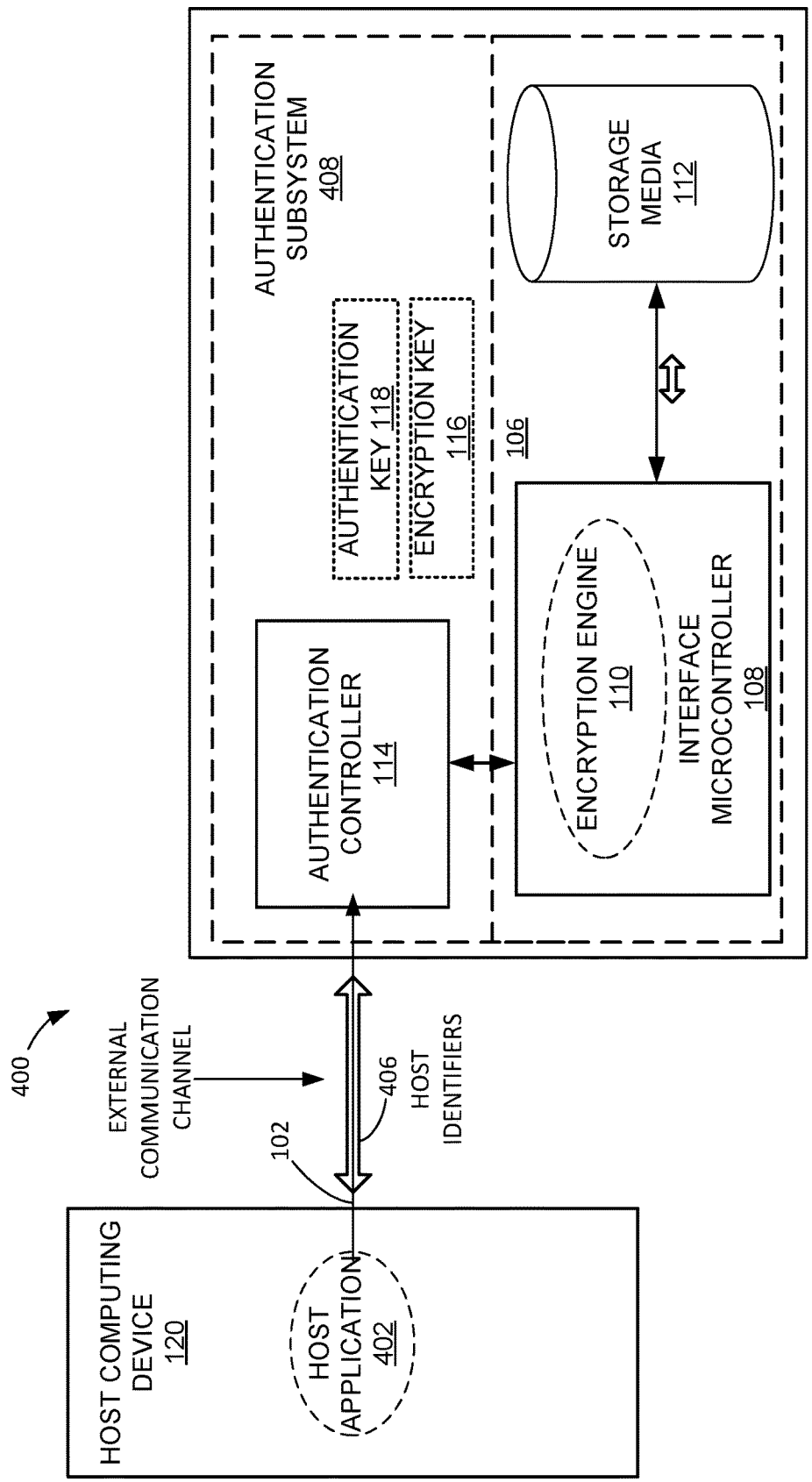
FIG. 4 is an illustration of how the user can employ the host computer system to interact with a data security system.

Referring now to FIG. 4, therein shows an illustration of how the user 122 can employ the host computer system 120 to interact with a data security system 400.

The host computer system 120 is provided with a host application 402. The host application 402 is software or firmware, which communicates over the external communication channel 102 of the data security system 400.

The host application 402 delivers host identifiers 406, such as internal component serial numbers (e.g. hard drive), media access control (MAC) address of a network card, login name of the user, network Internet Protocol (IP) address, an ID created by the data security system and saved to the host, an ID created by the data security system and saved to the network, etc., associated with its environment. The host identifiers 406 are employed by an authentication subsystem 408 in the data security system 400.

When the authentication subsystem 408 validates the user 122 against the authentication key 118 by verifying the host identifiers 406, the data security system 400 will unlock.

For example, the user 122 connects the data security system 400 that is locked to the host computer system 120. The host application 402 sends the MAC address of its network card to the data security system 400. The data security system 400 recognizes this MAC address as legitimate and unlocks without the user 122 of FIG. 1 having to enter user identification. This is implementation does not require any interaction with the user 122. In this case, it is the host computer system 120 and its associated environment that are being validated.

The data security system 400 includes: providing the authentication key 118 stored in the authentication subsystem 104; providing verification of the host computer system 120 by the authentication subsystem 104; presenting the encryption key 116 to the storage subsystem 106 by the authentication subsystem 104; and providing access to the storage media 112 by the storage subsystem 106 by way of decrypting the storage media content.

The data security system further includes the authentication subsystem 104 for interpretation of biometric input and verification of the user 122.

The data security system further includes using the authentication key 118 as the encryption key 116 directly.

The data security system further includes using the authentication key 118 to decrypt and retrieve the encryption key 116 used to decipher internal content.

The data security system further includes the authentication subsystem 104 for interpretation of signal inputs and verification of sending unit.

The data security system further includes the authentication subsystem 104 for interpretation of manually entered input and verification of the user 122.

The data security system further includes the authentication subsystem 104 for interpretation of input sent by a host resident software application for verification of the host computer system 120.

The data security system as further includes the encryption engine 110 outside the interface controller 108 but connected to the external communication channel 102 for the purpose of converting clear data to encrypted data for unlocking the data security system 100.

Figure 5:
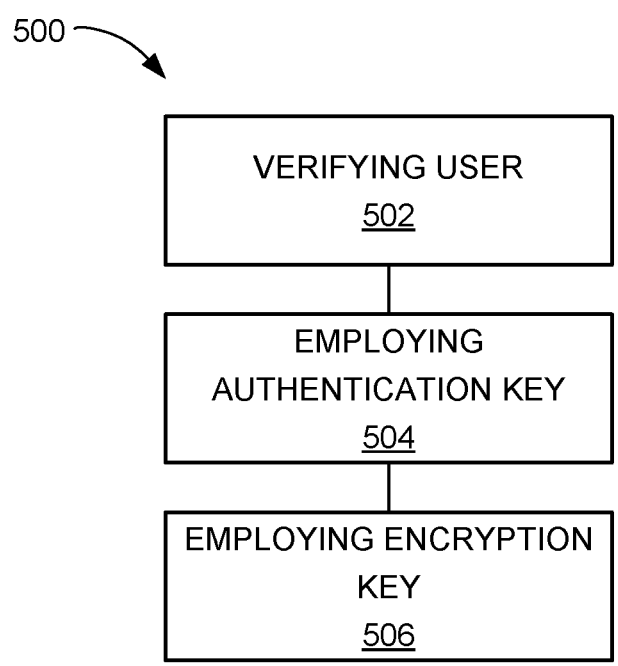
FIG. 5 is a data security method employing user verification for the data security system.

Referring now to FIG. 5, therein is shown a data security method 500 employing user verification for the data security system 100. The data security method 500 includes; verifying the user against an authentication key in a block 502; employing the authentication key for retrieving an encryption key in a block 504; and employing the encryption key for allowing unencrypted communication through a storage subsystem between a host computer system and a storage media in a block 506.

Figure 6:
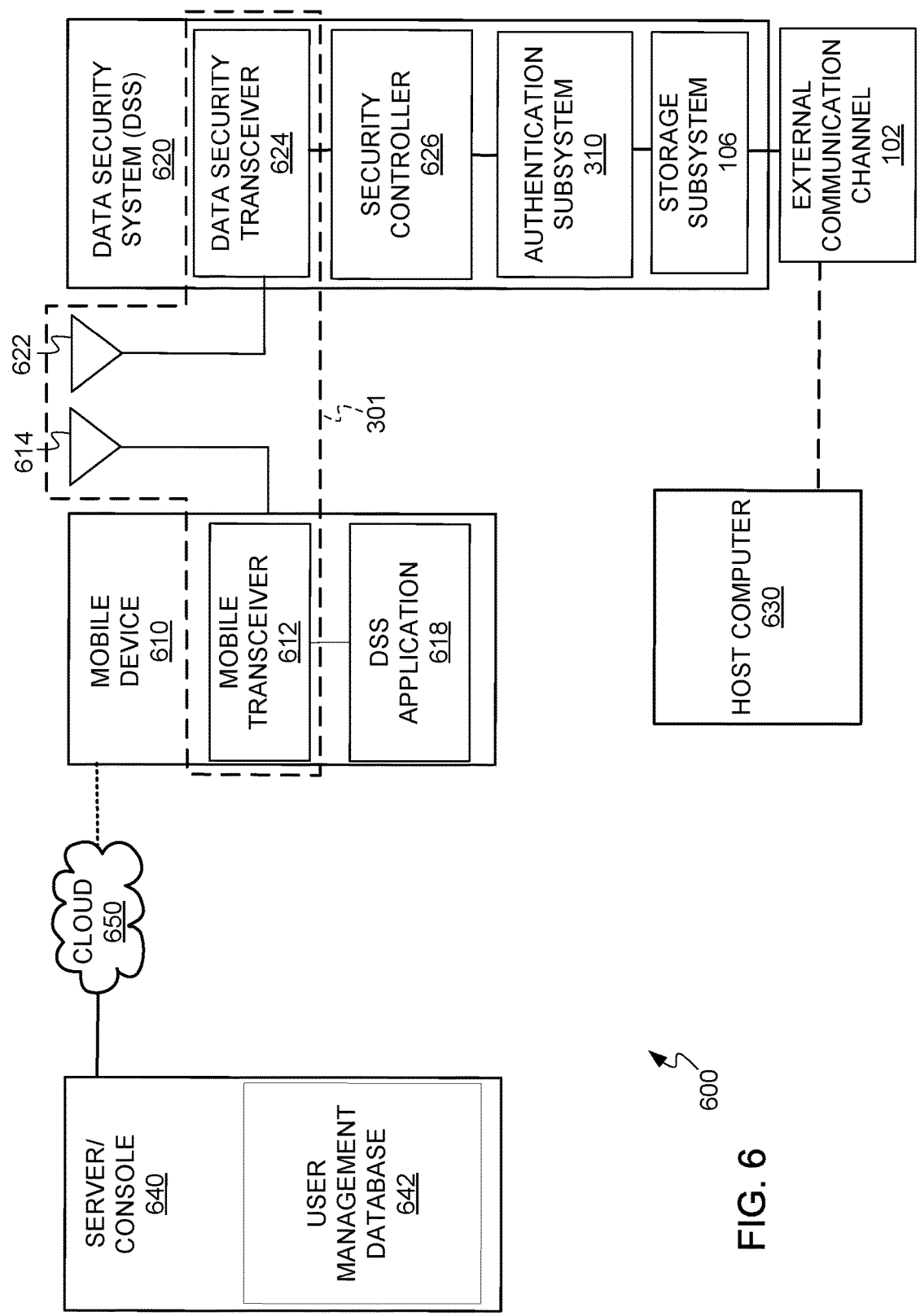
FIG. 6 is an exemplary data security communication system.

Referring now to FIG. 6, therein is shown an exemplary data security communication system 600. The exemplary data security communication system 600 includes a mobile device 610, a data security system 620, a host computer 630, and a server/console 640. The mobile device 610 and the server/console 640 are connected by wired or wireless connections through a cloud 650, which can be an Internet cloud. The mobile device 610 and the data security system 620 are connected by the communication combination 301.

The communication combination 301 in the exemplary data security communication system 600 includes a mobile transceiver 612 in the mobile device 610 with an antenna 614 wirelessly communicating with an antenna 622 of a data security transceiver 624 in the data security system 620.

The mobile device 610 in one embodiment can be a smartphone. In the mobile device 610, the mobile transceiver 612 can be connected to conventional mobile device components and to a data security system application 618, which provides information to be used with the data security system 620.

The data security transceiver 624 is connected to a security controller 626, which can contain identification, passwords, profiles, or information including that of different mobile devices that can access the data security system 620. The security controller 626 is connected to subsystems similar to the authentication subsystem 310, the storage subsystem 106 (which in some embodiments can have encryption to encrypt data), and the external communication channel 102.

The external communication channel 102 is connectable to the host computer 630 to allow, under specified circumstances, access to data in the storage subsystem 106.

One implementation of the data security system 620 can eliminate the biometric sensor 320 and the electro-mechanical input mechanism 330 of FIG. 3 with only a wireless link to the mobile device 610, such as a smartphone. It has been found that this implementation makes the data security system 620 more secure and useful.

The data security system application 618 allows the mobile device 610 to discover all data security systems in the vicinity of the mobile device 610 and show their status (locked/unlocked/blank, paired/unpaired etc.).

The data security system application 618 allows the mobile device 610 to connect/pair, lock, unlock, change the name and password, and reset all data on the data security system 620.

The data security system application 618 allows the mobile device 610 to set an inactivity auto-lock so the data security system 620 will automatically lock after a predetermined period of inactivity or to set a proximity auto-lock so the data security system 620 will be locked when the mobile device 610 is not within a predetermined proximity for a predetermined time period (to improve reliability and avoid signal de-bouncing).

The data security system application 618 allows the mobile device 610 to remember a password, use TouchID, and Apple Watch (both TouchID and Apple Watch mentioned here as examples only, there are many other mobile devices with biometric sensors and wearables that can be used in a similar mode) so data security system 620 could be unlocked without entering re-entering a password on the mobile device The data security system application 618 allows the mobile device 610 to be set to operate only with a specific mobile device, such as the mobile device 610, so the data security system 620 cannot be unlocked with other mobile devices (1Phone).

The data security system application 618 allows the mobile device 610 to set the data security system 620 to Read-Only The data security system application 618 allows the mobile device 610 to operated in User Mode or Administrator Mode (administrator's mode overrides user's settings) and use the server/console 640. The server/console 640 is a combination of a computer with a console for entering information into the computer.

The server/console 640 contains a user management database 642, which contains additional information that can be transmitted over the cloud 650 to the mobile device 610 to provide additional functionality to the mobile device 610.

The user management database 642 allows the server/console 640 to create and identify users using UserID (username and password) and block/allow unlocking the data security system 620 and provide remote help.

The user management database 642 allows the server/console 640 to remotely reset or unlock the data security system 620.

The user management database 642 allows the server/console 640 to remotely change the data security system user's PIN.

The user management database 642 allows the server/console 640 to restrict/allow unlocking data security system 620 from specific locations (by using geo-fencing)

The user management database 642 allows the server/console 640 to restrict/allow unlocking data security system 620 in specified time periods and different time zones The user management database 642 allows the server/console 640 to restrict unlocking data security system 620 outside of specified team/organization/network etc.

Figure 7:
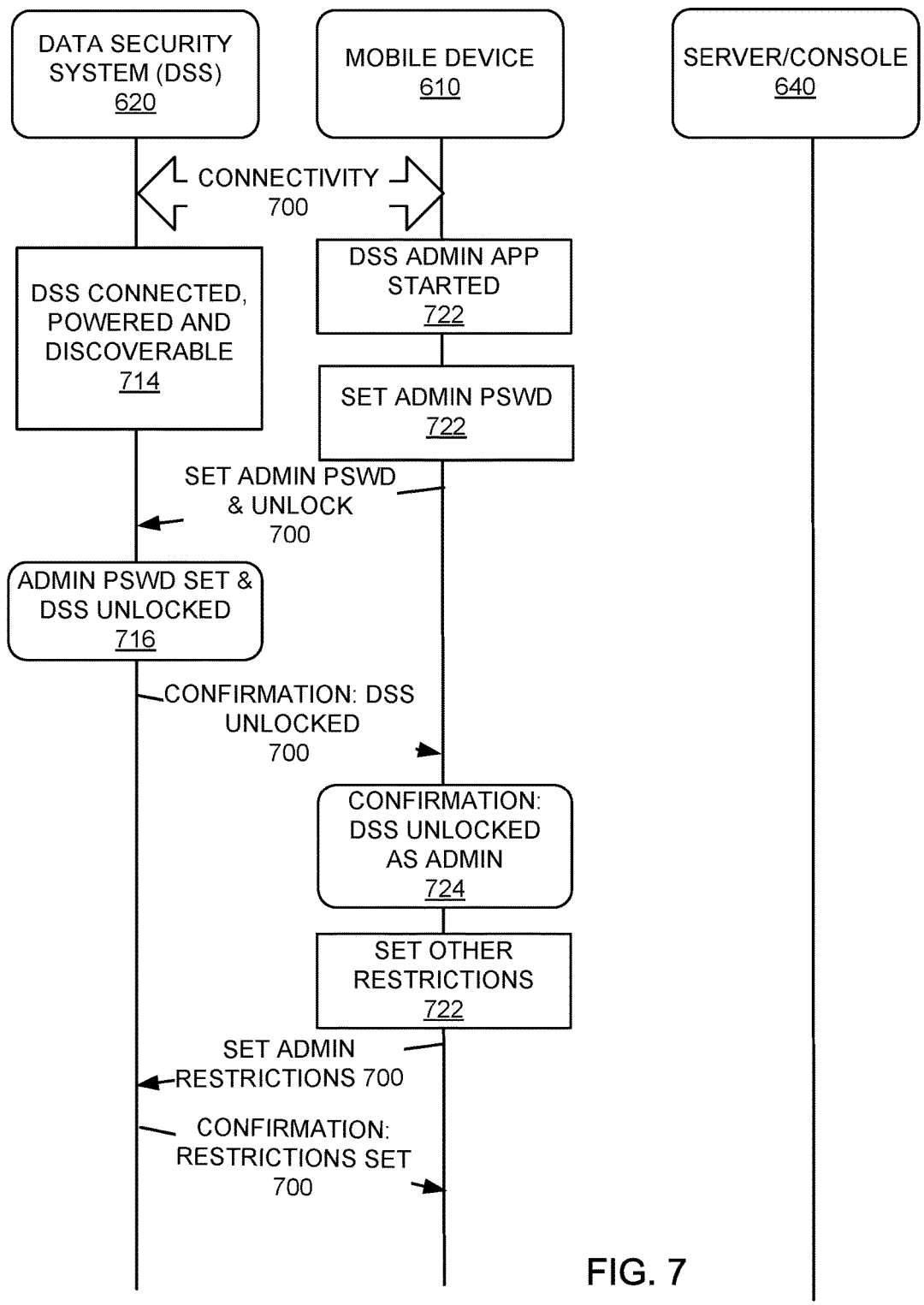
FIG. 7 is an administrator sequencing diagram showing the sequence of operations between a mobile device and the data security system.

Referring now to FIG. 7, therein is shown an administrator sequencing diagram showing the sequence of operations between the mobile device 610 and the data security system 620.

Connectivity 700, between the data security system 620 and the mobile device 610, is first established with mutual discovery of the other device or system, pairing the device and system, and connection of the device and system. The connectivity 700 is secured using a shared secret, which is then used to secure (encrypt) communications between the data security system 620 and the mobile device 610 for all future communication sessions. A standard encryption algorithm is selected to be both efficient to run on the data security system 620 and to be approved by world-wide security standards.

The connectivity 700 is maintained by the data security system application 618 or the security controller 628 or both operating together as long as the data security system 620 and the mobile device 610 are within a predetermined distance of each other. Further, if the predetermined distance is exceeded, the connectivity 700 is maintained for a predetermined period of time after which the data security system 620 is locked.

After connection of the mobile device 610 and the data security system 620, a data security system administrator application start operation 702 occurs in the mobile device 610. Then an administrator sets a password in an administrator password operation 704. Also after connection of the mobile device 610 and the data security system 620, the data security system 620 is connected to the host computer 630 of FIG. 6 to be powered up and discoverable by the host computer 630 in a data security system connected, powered and discoverable operation 706.

After the administrator password operation 704, the mobile device 610 sends a set administrator password and unlock signal 708 to the data security system 620. The set administrator password and unlock signal 708 causes an administrator password set and data security system unlocked operation 716 to occur in the data security system 620.

When the administrator password set and data security system unlocked operation 716 is completed, a confirmation: data security system unlocked signal 712 is sent to the mobile device 610 where a confirmation: data security system unlocked as administrator operation 714 operates. The confirmation: data security system unlocked as administrator operation 714 permits a set other restrictions operation 716 to be performed using the mobile device 610. The set other restrictions operation 716 causes a set administrator restrictions signal 718 to be sent to the data security system 620 where the administrator restrictions are set and a confirmation: restrictions set signal 720 is returned to the mobile device 610. Thereafter, the mobile device 610 and the data security system 620 are in full operative communication.

Because it is possible to communicate with the data security system 620 without having physical contact with the data security system 620, it is required that significant interactions with the data security system 620 be accompanied by a data security system unique identifier that is either printed on the data security system 620 itself, or that comes with the data security system 620 packaging and is readily available to the data security system 620 owner.

On making requests that could affect user data, such as unlocking or resetting the data security system 620, this unique identifier (unique ID) is required. Attempts to perform these operations without the correct identifier are ignored and made harmless. The unique identifier is used to identify the data security system 620 to the mobile device 610 in a way that requires the user to have physical control over the data security system 620 and to verify the connectivity 700 is established between the authorized, previously paired device and system, such as the mobile device 610 and the data security system 620. Once the devices are paired, the shared secret is used to make the communication confidential.

Pairing connotes that a mobile device and a data security system have a unique and defined relationship established at some time in the past and enduring.

The unique identifier makes for giving the user some control over the data security system when the user has physical control of the data security system.

To increase the security of the communication with the data security system 620 where the mobile device 610 is a smartphone, a user may choose to enable a feature, such as a feature called 1Phone here. This feature restricts significant user interactions with the data security system 620 to one and only one mobile device 610. This is done by replacing the data security system unique identifier described above with a random identifier shared securely between the data security system 620 and the mobile device 610. So, instead of presenting the data security system unique identifier when, for example, the user unlocks the data security system 620, the 1Phone identifier must be given instead. In effect, this makes the user's mobile device 610 a second authentication factor for using the data security system 620 in addition to a PIN or password. As an example, the paired user phone selected as "1Phone" can be used without a PIN, and as the user-authentication single factor and/or in a combination with any other user-authentication factors. If such feature (1Phone) is selected, the data security system 620 cannot be open with any other phones, except if an administrator's unlock was enabled before.

It will be understood that other embodiments can be made to require an administrat'r's password on the data security system 620 in order to use the 1Phone feature. Another embodiment may require that the server/console 640 is capable of recovering the data security system 620 in case the 1Phone data is lost on the mobile device 610.

The user may enable a proximity auto-lock feature for the data security system 620. During a communication session, the data security transceiver 624 of FIG. 6 reports to the data security system 620 a signal strength measurement for the mobile device 610. The data security system application 618 on the mobile device 610 sends the data security system 620 both the originating signal power level and the threshold for proximity.

Because the signal strength varies due to environmental conditions around the transceivers, the data security system 620 mathematically smoothes the signal strength measurements to reduce the likelihood of a false positive. When the data security system 620 detects that the signal power received has dropped below a defined threshold for a predetermined period of time, it will immediately lock the data security system 620 and prevent access to the storage subsystem 106 of FIG. 6.

The data security system 620 could be used in three different modes: a User Mode where the functionalities of the data security system 620 are determined by the user; an Administrator Mode where an administrator can set an Administrator password and enforce some restrictions on the data security system 620 (e.g., automatic lock after a predetermined period of inactivity, Read-Only, 1Phone) and where restrictions cannot be removed by a User; and a Server Mode where an administrator role is set where the server/console 640 can remotely reset the data security system 620, change user passwords, or just unlock the data security system 620.

Figure 8:
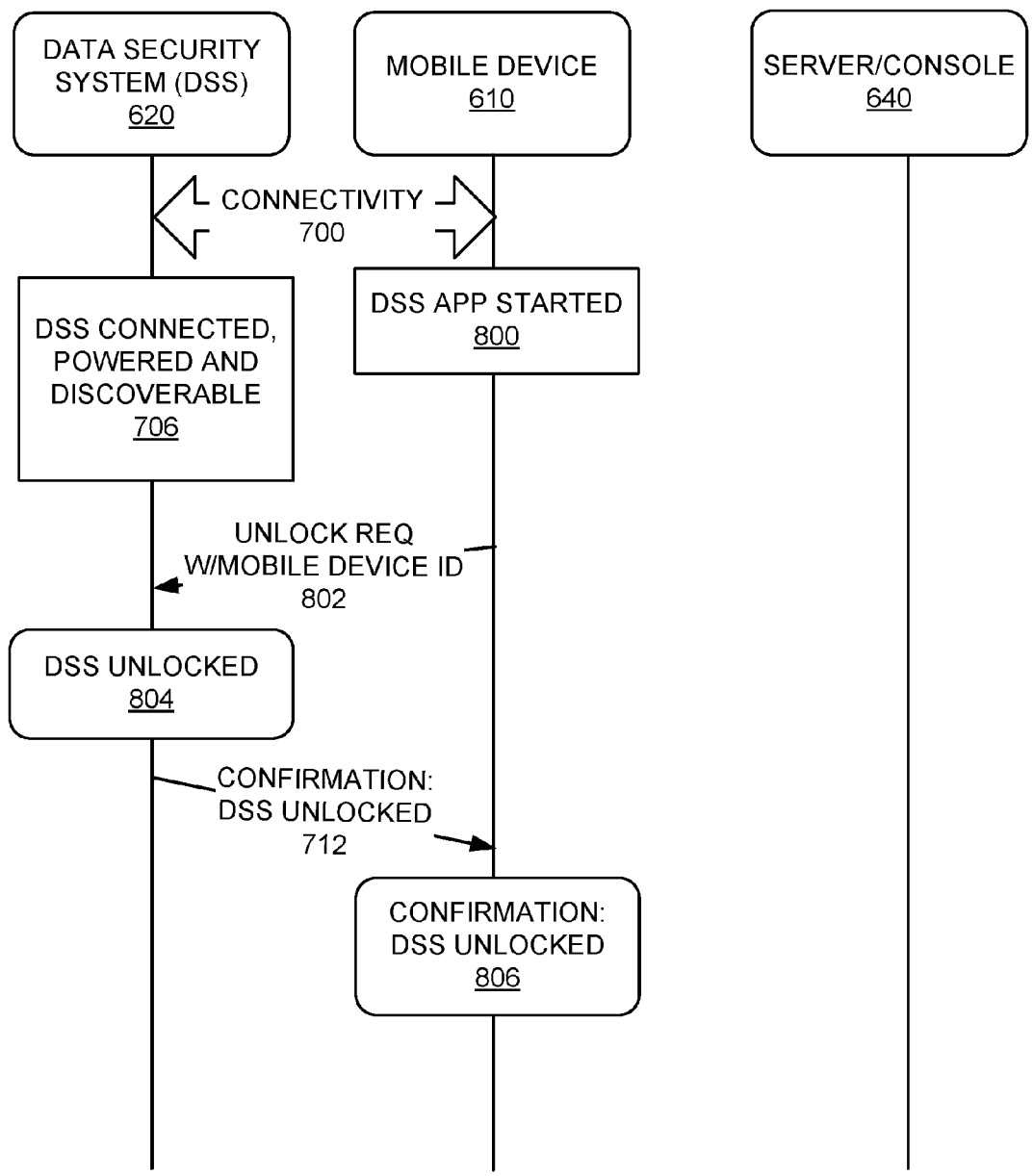
FIG. 8 is a unlocking sequence diagram where the mobile device is an authentication factor.

Referring now to FIG. 8, therein is shown a unlocking sequence diagram where the mobile device 610 is an authentication factor. This diagram shows auto-unlock process of the data security system 620 initiated by the data security system application 618 from specific mobile device, the mobile device 610. A user can use only one mobile device that was initially paired with the data security system 620. If the paired mobile device 610 is lost then the data security system 620 could not be unlocked (unless administrator password was set before as shown in FIG. 7).

While similar to FIG. 7, a data security system application started operation 800 occurs after the connectivity 700 is established. An unlock required with mobile device ID signal 802 is sent from the mobile device 610 to the data security system 620 after a data security system connected, powered and discoverable operation 706. A data security system unlocked operation 804 occurs and a confirmation: data security system unlocked signal 712 is sent from the data security system 620. After a confirmation: data security system unlocked operation 806, the mobile device 610 and the data security system 620 are in full operative communication.

If a PIN (Personal Identification Number) was not setup then the paired mobile device is used as 1-authentication factor.

Figure 9:
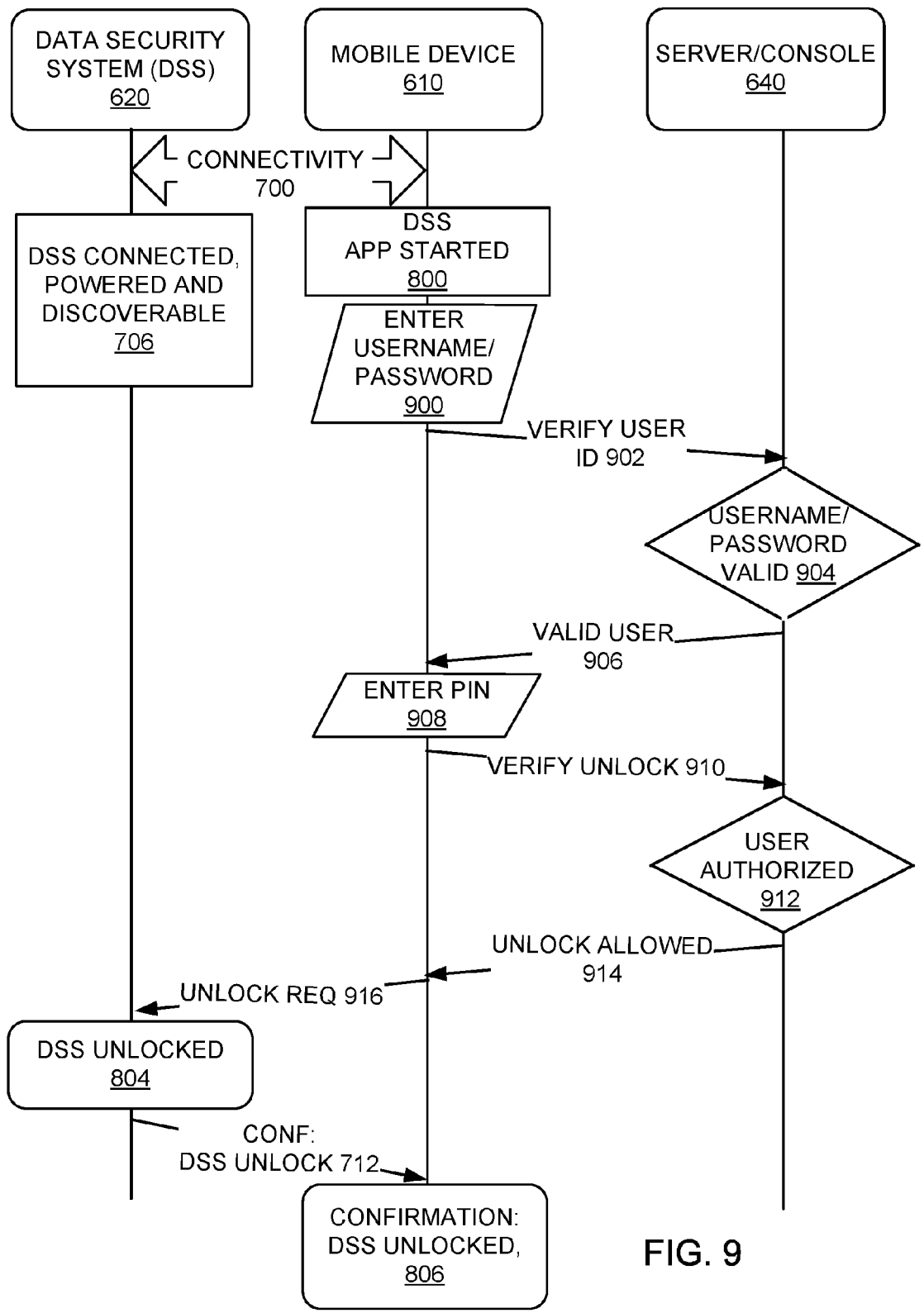
FIG. 9 is an unlock sequencing diagram showing unlocking using a PIN entry from the mobile device.

Referring now to FIG. 9, therein is shown an unlock sequencing diagram showing unlocking using a PIN entry from the mobile device 610. This diagram shows process of unlocking the data security system 620 by entering a PIN in the data security system application 618 in the mobile device 610. The data security system 620 cannot be unlocked without entering the correct PIN.

While similar to FIGS. 7 and 8, an enter username/password operation 900 occurs after the data security system application started operation 800. After the enter username/password operation 900, the mobile device 610 sends a verify user ID signal 902 to the server/console 640. The server/console 640 then makes a username/password valid determination 904.

When the username/password valid determination 904 verifies the user, a valid user signal 906 is sent to the mobile device 610 for the user to enter the correct PIN in an enter PIN operation 908 in the mobile device 610. The mobile device 610 then sends a verify unlock signal 910 to determine if the correct PIN has been entered to the server/console 640.

The server/console 640 makes a user authorized determination 912 and determines if the user is authorized to use the specific data security system, such as the data security system 620, that the PIN is authorized for. If authorized, an unlock allowed signal 914 is sent to the mobile device 610, which passes on an unlock request signal 916 to the data security system 620.

The data security system unlocked operation 804 is performed and the confirmation: data security system unlocked signal 712 is sent to the mobile device 610 where the confirmation: data security system unlocked operation 806 is performed.

Figure 10:
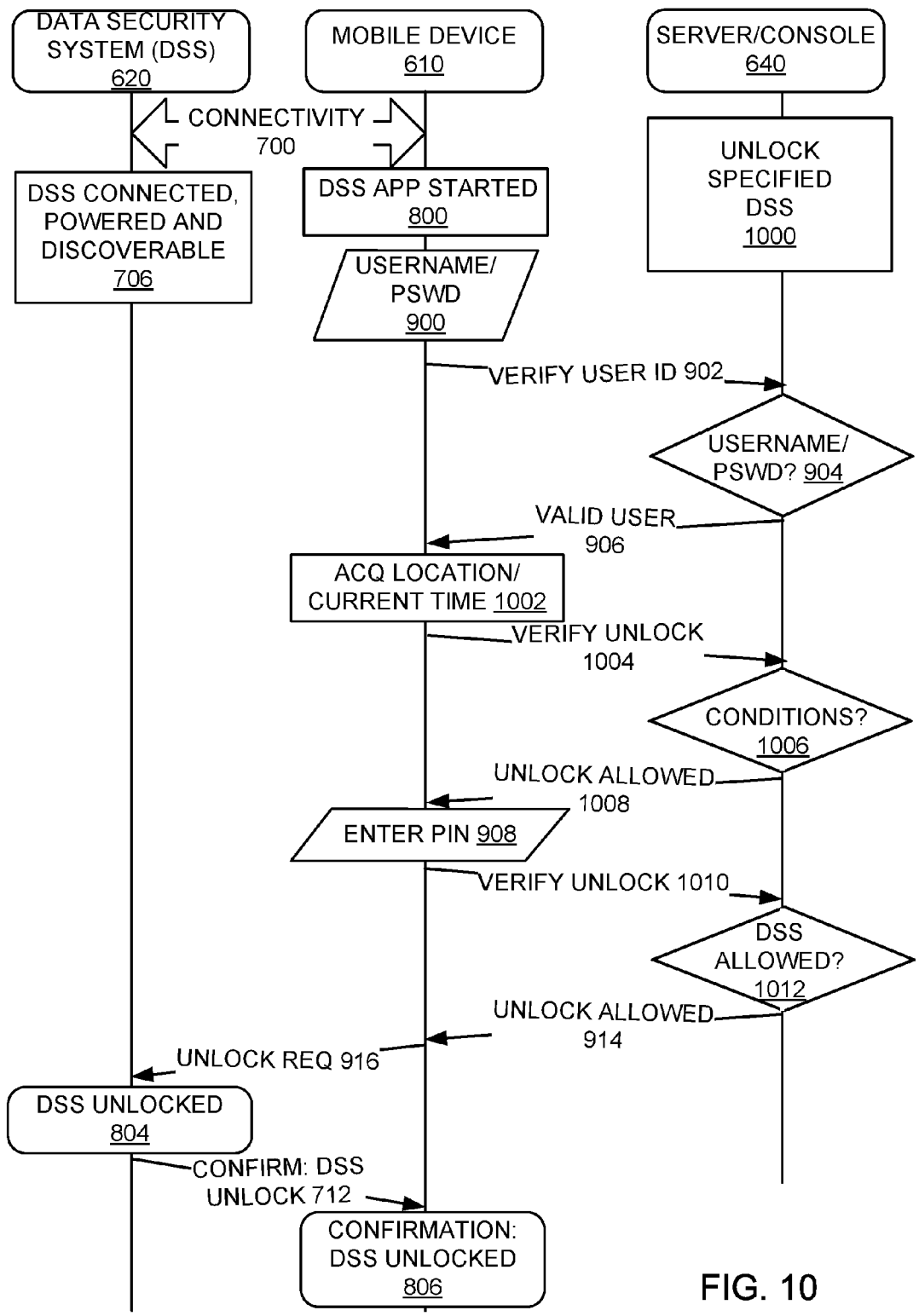
FIG. 10 is an unlock sequencing diagram showing unlock using a PIN entry and User ID/location/time verification via the server/console.

Referring now to FIG. 10, therein is shown an unlock sequencing diagram showing unlock using a PIN entry and User ID/location/time verification via the server/console 640. This diagram shows the most secure process of unlocking the data security system 620 by entering a PIN in the data security system application 618 from the mobile device 610, authentication in the server/console 640 server using a UserID (username/password) and by verifying geo-fencing permissions to unlock the data security system 620 at a specific location and at a certain time range. The data security system 620 could not be unlocked without entering the PIN, username and password, and having the mobile device 610 be present in specific (predefined) location and certain (predefined) time.

While similar to FIGS. 7-9, at the server/console 640, an unlock specified data security system operation 1000 is performed to allow setting of the desired conditions under which the specified data security system, such as the data security system 620, will operate. For example, the conditions could be within a specific geographical area and/or specific time frame.

At the mobile device 610, a current condition determination is made, such as in an acquire location and/or current time operation 1002. This operation is performed to determine where the mobile device 610 is located and or what the current time is where the mobile device 610 is located. Other current conditions around the mobile device 610 may also be determined and sent by a verify unlock signal 1004 to the server/console 640 where a conditions met determination 1006 is made.

When the desired conditions are met, an unlock allowed signal 1008 is sent to the mobile device 610 for the enter PIN operation 908 to be performed. After the PIN is entered, a verify unlock signal 1010 is sent with the PIN and an identification of the data security system 620 that is in operational proximity to the mobile device 610. The verify unlock signal 1010 is received by the server/console 640 and a data security system allowed determination 1012 is made to determine that the specified data security system is allowed to unlock by the authorized user. The server/console 640 verifies that this "specific" user is authorized to use the specified data security system.

After determining the correct information has been provided, the server/console 640 will provide an unlock allowed signal 914 to the mobile device 610, which will provide a unlock request signal 916. The unlock request signal 916 causes the data security system 620 to operate.

Figure 11:
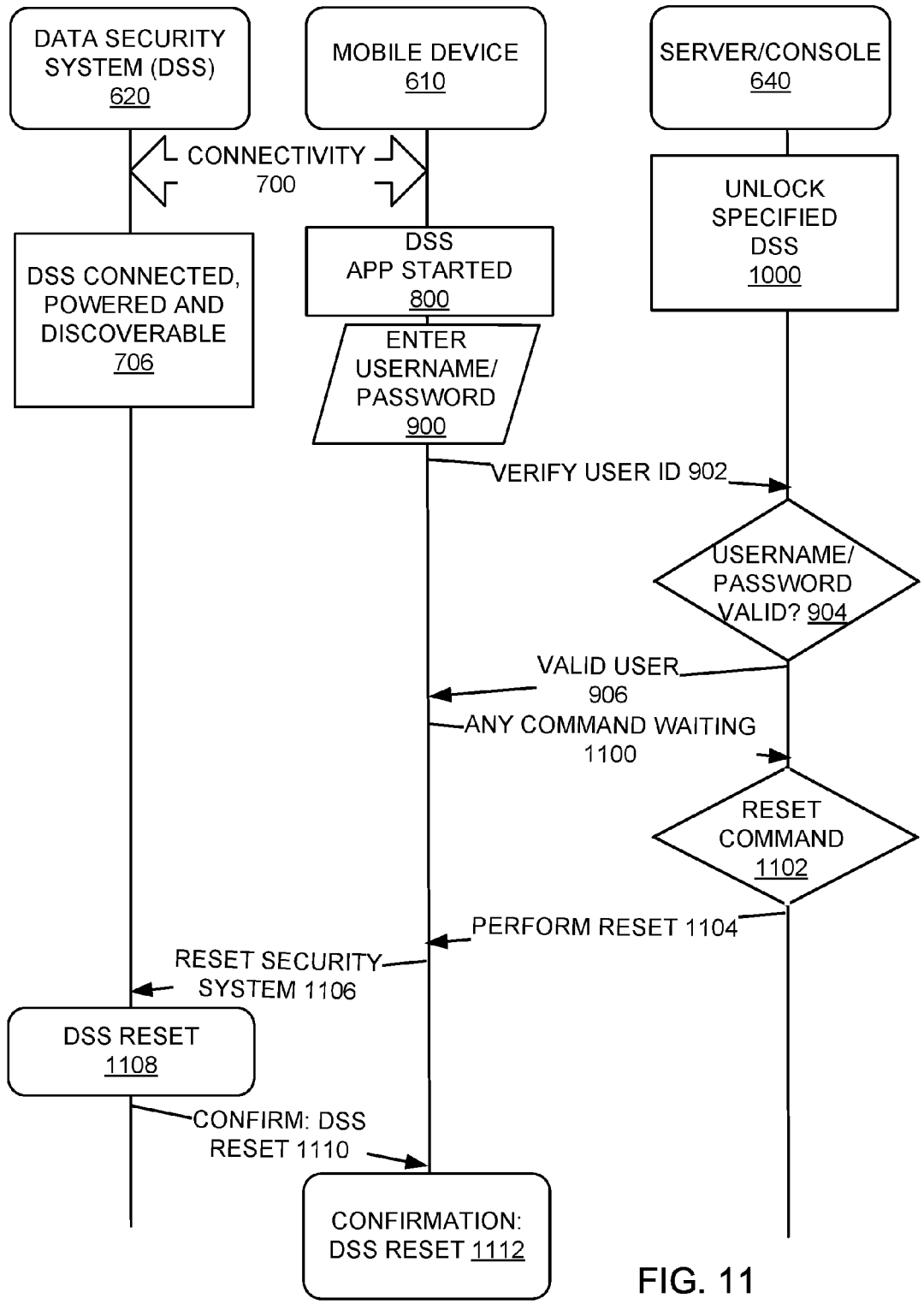
FIG. 11 is a reset sequencing diagram showing resetting the data security system using a server/console.

Referring now to FIG. 11, therein is shown a reset sequencing diagram showing resetting the data security system 620 using the server/console 640. This diagram shows the ability to reset the data security system 620 remotely via the server/console 640. The data security system 620 can receive commands only from the mobile device 610 over the wireless connection. However, by setting a "Reset" flag on the server/console 640 for a specific data security system (using it's S/N), the data security system application 618 running on the mobile device 610 will query the server/console 640 for any flags/pending requests in the user management database 642. When the user connects the data security system 620, the data security system application 618 on the mobile device 610 will execute a waiting "reset" command. After a successful reset (all user data and credentials are gone), the server/console 640 will remove the Reset flag so it will be not be executed the next time when the mobile device 610 is connected to the specific data security system.

While similar to FIGS. 7-10, the mobile device 610 responds to the valid user signal 906 to send an any command waiting signal 1100 to the server/console 640 to make a reset command determination 1102. When the reset command is present, a perform reset signal 1104 will be sent to the mobile device 610.

The mobile device 610 will send a reset security system signal 1106 to the data security system 620 to start a data security system reset operation 1108. Upon completion of the data security system reset operation 1108, the data security system 620 will send a confirmation: data security system reset signal 1110 to the mobile device 610 to set a confirmation: data security system reset operation 1112 into operation. Thereafter, the mobile device 610 and the data security system 620 are in full operative communication with the data security system 620 reset.

Figure 12:
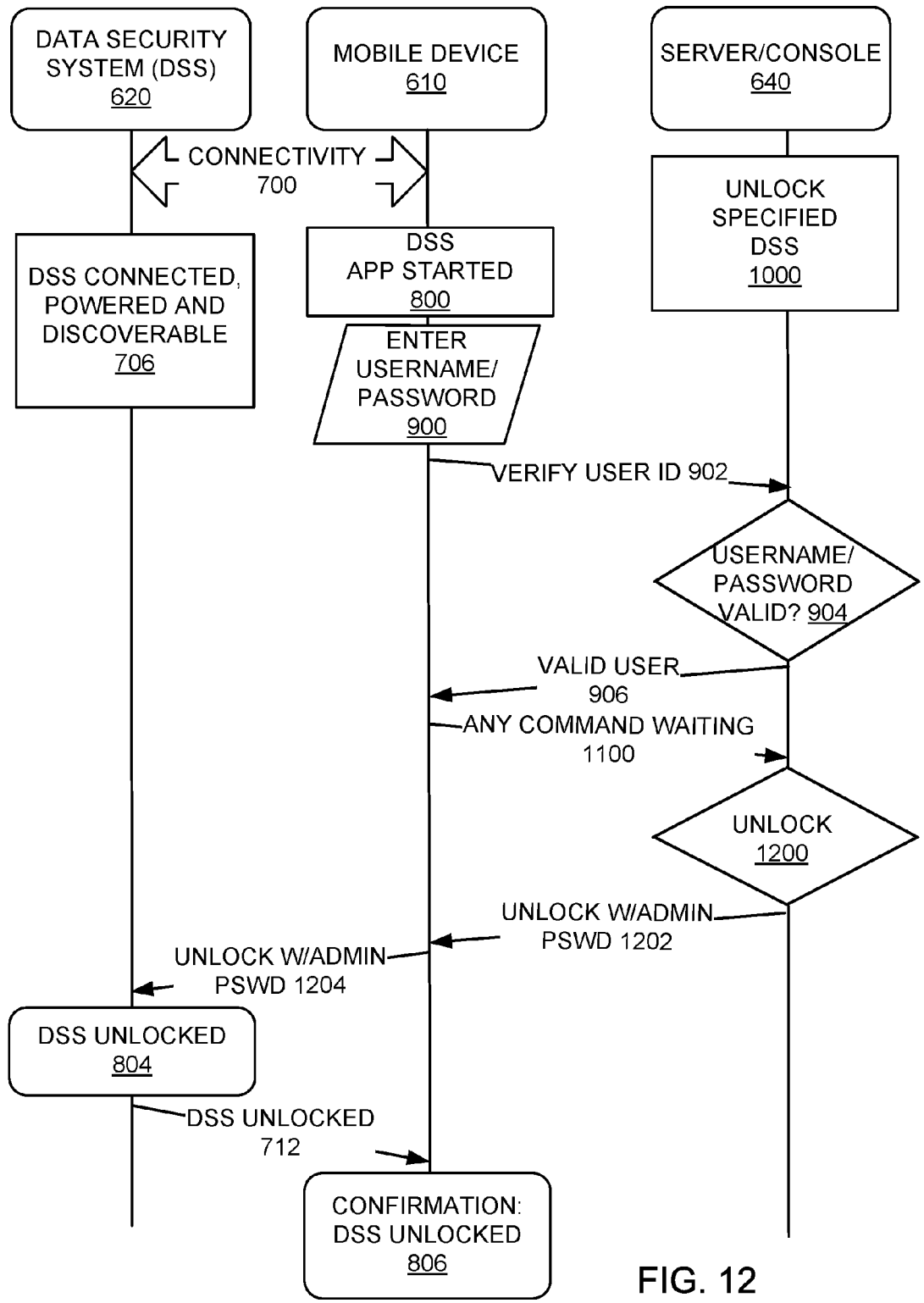
FIG. 12 is an unlock sequencing diagram showing unlocking the data security system using the server/console.

Referring now to FIG. 12, therein is shown an unlock sequencing diagram showing unlocking the data security system 620 using the server/console 640. This diagram shows ability to unlock the data security system 620 remotely via the server/console 640. The data security system 620 can receive commands only from the mobile device 610 over the wireless connection. However by setting an "Administrator Unlock" flag on the server/console 640 console for a specific data security system (using it's S/N), the data security system application 618 running on the mobile device 610 will query the server/console 640 for any flags/pending requests. When the user connects the data security system 620, the data security system application 618 on the mobile device 610 will execute a waiting "Administrator Unlock" command. After successful Administrator unlock, the user's data is untouched, but the user's password is removed (the data security system 620 cannot be unlocked by the user). The server/console 640 will remove Reset flag for the data security system 620 so it will be not executed next time when the mobile device 610 is connected to the data security system 620.

While similar to FIGS. 7-11, after receiving the any command waiting signal 1100, the server/console 640 performs an unlock 1200 when there is a command to unlock with an administrator's password. An unlock with an administrator's password signal 1202 is sent to the mobile device 610, which provides an unlock with administrator's password signal 1204 to the data security system 620 to start the data security system unlocked operation 804. Thereafter, the mobile device 610 and the data security system 620 are in full operative communication.

Figure 13:
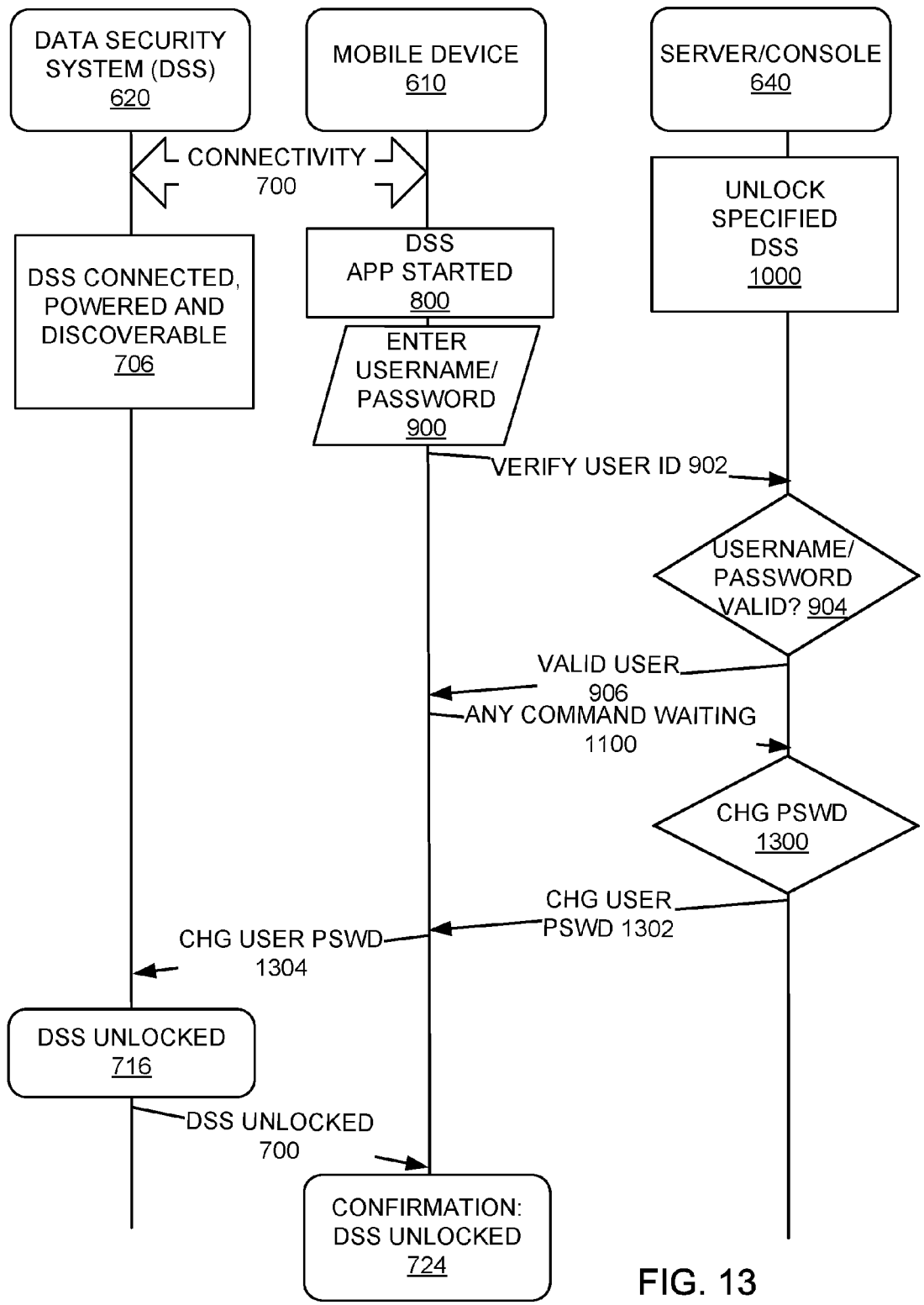
FIG. 13 is a change user's password sequencing diagram using the server/console.

Referring now to FIG. 13, therein is shown a change user's password sequencing diagram using the server/console 640. This diagram shows ability to change User's password for data security system 620 remotely via the server/console 640. Even data security system 620 can receive commands only from the mobile device 610 over the wireless connection, by setting a "Change User's Password" flag on the server/console 640 console for a specific data security system (using it's S/N), the data security system application 618 running on the mobile device 610 will query the server/console 640 for any flags/pending requests. When user will connect his data security system 620, the data security system application 618 on the mobile device 610 will execute waiting "Change User's Password" command. After successful unlock and changed password, the user's data is untouched and the data security system 620 can be unlocked with new user's password. The server/console 640 will remove "Change User's Password" flag for this data security system 620 so it will be not executed next time when the mobile device 610 is connected to the specific data security system.

While similar to FIGS. 7-12, the server/console 640 responds to the any command waiting signal 1100 by making a change password determination 1300. When there has been a password change at the server/console 640 a change user password signal 1302 is sent to the mobile device 610, which sends a change user password signal 1304 to the data security system 620. Thereafter, the mobile device 610 and the data security system 620 are in full operative communication with the new password.

A method of operation of a data security system comprising: providing a mobile device with a data security system application for connectivity with the data security system; starting the data security system application; and maintaining connectivity of the data security system with the mobile device.

The method as described above wherein maintaining the connectivity maintains the connectivity when the data security system is within a predetermined proximity to the mobile device.

The method as described above wherein maintaining the connectivity maintains the connectivity when the data security system is within a predetermined proximity to the mobile device for a predetermined period of time.

The method as described above wherein establishing the connectivity includes using bi-directional communication between the data security system and the mobile device.

The method as described above wherein establishing the connectivity includes using uni-directional communication between the data security system and the mobile device.

The method as described above further comprising communication between the mobile device with the data security system application and a server containing a user management database.

The method as described above further comprising providing security information in a security controller in the data security system.

The method as described above further comprising: providing a server with identification of a specified data security system; providing the data security system with a specific identification; and unlocking the data security system when the identification of the specified data security system is the same as the specific identification of the data security system.

The method as described above wherein providing a mobile device with the data security system application provides a data security system administrator's application and further includes: setting an administrator's password in the mobile device; transmitting the administrator's password from the mobile device to the data security system; and setting the administrator's password in the data security system and unlocking the data security system.

The method as described above further comprising: providing an unlock request along with a mobile device identification from the mobile device to the data security system; and receiving the unlock request in the data security system and unlocking the data security system.

The method as described above further comprising: entering a user name or password in the mobile device; determining when the user name or password is valid in a server after receiving the user name or password from the mobile device; communicating from the server to the mobile device when the user name or password is valid; and communicating from the mobile device to the data security system when the user name or password is valid to unlock the data security system.

The method as described above further comprising: entering a user name or password in the mobile device; determining when the user name or password is valid in a server after receiving the user name or password from the mobile device; communicating from the server to the mobile device when the user name or password is valid; determining when the identification number is valid in the server after receiving identification number from the mobile device; and unlocking the data security system through the mobile device when the server determines the identification number is valid.

The method as described above further comprising: providing a valid location of the mobile device to a server; determining in the server when the mobile device is in the valid location; and unlocking the data security system through the mobile device when the server determines the mobile device is in the valid location.

The method as described above further comprising: providing a current time of operation for the data security system at the mobile device to a server; determining in the server when the mobile device is within the current time; and unlocking the data security system through the mobile device when the server determines the mobile device has the current time.

The method as described above further comprising: providing a command in a server; providing the command to the mobile device from the server in response to a command waiting signal from the mobile device; and performing the command in the data security system through the mobile device when the command is provided from the server.

The method as described above further comprising: providing a change password command in a server; providing the change password command to the mobile device from the server in response to a change password signal from the mobile device; and unlocking the data security system with the changed password in the data security system.

The method as described above further comprising connecting the data security system to a host computer for power and to be discoverable by the host computer.

A data security system comprising: a data security transceiver or receiver; an authentication subsystem operatively connected to the data security transceiver or receiver; and a storage subsystem connected to the authentication subsystem.

The system as described above further comprising a security controller connected to the data security transceiver or the receiver and to the authentication subsystem.

The system as described above further comprising a mobile device having a data security system application operating with the security controller for maintaining connectivity when the data security system is within a predetermined proximity to the mobile device.

The system as described above further comprising a mobile device having a data security system application operating with the security controller for maintaining connectivity when the data security system is within a predetermined proximity to the mobile device for a predetermined period of time.

The system as described above further comprising a mobile device having a mobile transceiver or receiver for maintaining connectivity includes using bi-directional communication between the data security system and the mobile device.

The system as described above further comprising a mobile device having a mobile transceiver or receiver for maintaining connectivity includes using uni-directional communication between the data security system and the mobile device.

The system as described above further comprising a wired or wireless connection communication between a mobile device with a data security system application and a server containing a user management database.

The system as described above wherein the data security system includes an external communication channel for connection to a host computer.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a data security system comprising:
    providing a wireless device with a data security system application, for execution on the wireless device, for managing connectivity with the data security system, the data security system having a storage subsystem and a data security transceiver for wireless communication, the wireless device having a device transceiver for wireless communication;
    receiving, by the data security system application, authentication information from a user to be authenticated by a server;
    requesting, by the data security system application and from the server, authentication of the user based on the authentication information;
    in response to the server successfully authenticating the user, requesting, by the data security system application and from the server, unlocking of the data security system based on a personal identification number provided by the user to the data security system application, wherein the unlocking is communicated, from the wireless device to the data security system, via a wireless connection between the data security transceiver and the device transceiver; and
    when the server provides an unlock signal to the data security system application, unlocking connectivity to the data security system from the wireless device and enabling access from the wireless device to the storage subsystem in the data security system.

2. The method as claimed in claim 1, further comprising:
    maintaining the connectivity when the data security system is within a proximity to the wireless device based on a signal strength measurement of the wireless connection for the wireless device.

3. The method as claimed in claim 1, further comprising:
    maintaining the connectivity when the data security system is within a proximity to the wireless device based on a signal strength measurement of the wireless connection for the wireless device for a predetermined period of time.

4. The method as claimed in claim 1, wherein the wireless connection includes bi-directional communication between the data security system and the wireless device.

5. The method as claimed in claim 1, wherein the wireless connection includes uni-directional communication between the data security system and the wireless device.

6. The method as claimed in claim 1, wherein the server contains a user management database with user authentication information.

7. The method as claimed in claim 1, further comprising: providing a security controller in the data security system for controlling access to the data security system.

8. The method as claimed in claim 1, wherein requesting unlocking of the data security system further comprises:
providing the server with an identification of the data security system; and
unlocking the data security system when the identification of the data security system is enabled at the server.

9. The method as claimed in claim 1, wherein providing the wireless device with the data security system application further comprises:
providing a data security system administrator's application;
setting an administrator's password in the wireless device;
transmitting the administrator's password from the wireless device to the data security system; and
setting the administrator's password in the data security system and unlocking the data security system.

10. The method as claimed in claim 1, wherein requesting unlocking of the data security system further comprises:
providing an unlock request along with a device identification from the wireless device to the data security system; and
receiving the unlock request in the data security system and unlocking the data security system.

11. The method as claimed in claim 1, wherein the authentication information includes a user name, or a password, or a combination thereof.

12. The method as claimed in claim 1, wherein requesting unlocking of the data security system further comprises:
transmitting the personal identification number from the wireless device to the server;
determining, by the server, when the personal identification number is valid after receiving the personal identification number from the wireless device; and
unlocking the data security system through the wireless device when the server determines the personal identification number is valid.

13. The method as claimed in claim 1, further comprising:
providing a valid location of the wireless device to the server;
determining, by the server, when the wireless device is in the valid location; and
unlocking the data security system through the wireless device when the server determines the wireless device is in the valid location.

14. The method as claimed in claim 1, further comprising:
determining a current time at the wireless device;
sending the current time to the server;
checking, by the server, a condition to determine if the current time is within a predefined time range; and
unlocking the data security system through the wireless device when the server determines the wireless device is within the predefined time range.

15. The method as claimed in claim 1, further comprising:
providing a command in the server;
providing the command to the wireless device, from the server, in response to a command waiting signal from the wireless device; and
performing the command in the data security system, through the wireless device, when the command is provided from the server.

16. The method as claimed in claim 1, further comprising:
providing a change password command in the server;
providing the change password command to the wireless device, from the server, in response to a change password signal from the wireless device; and
unlocking the data security system with the changed password command.

17. The method as claimed in claim 1, further comprising:
connecting the data security system to a host computer for powering the data security system, wherein the data security system becomes discoverable by the host computer.

18. The method as claimed in claim 1, wherein access from the wireless device to the storage subsystem in the data security system is performed on an external communication channel separate from the wireless connection.

19. A data security system comprising:
a wireless data security transceiver or receiver;
an authentication subsystem operatively connected to the wireless data security transceiver or receiver; and
a storage subsystem connected to the authentication subsystem, wherein the authentication subsystem is configured to communicate, via the wireless data security transceiver or receiver, with a data security system application on a wireless device;
wherein the data security system application is configured to request, from a server, authentication of a user based on authentication information provided by the user;
wherein, in response to the server authenticating the user, the data security system application is configured to request, from the server, unlocking of the data security system based on a personal identification number provided by the user and transmitted via the wireless data security transceiver or receiver from the wireless device to the data security system;
wherein, when the server provides an unlock signal to the wireless device, the wireless device sends the unlock signal to the data security system to unlock connectivity to the data security system from the wireless device and enable access from the wireless device to the storage subsystem in the data security system.

20. The data security system as claimed in claim 19, further comprising:
a security controller connected to the wireless data security transceiver or the receiver and to the authentication subsystem.

21. The data security system as claimed in claim 19, wherein the data security system application is for maintaining connectivity when the data security system is within a proximity to the wireless device based on a signal strength measurement of a wireless connection for the wireless device.

22. The data security system as claimed in claim 19, wherein the data security system application communicates with a security controller in the data security system for maintaining connectivity when the data security system is within a proximity to the wireless device and for locking the data security system when there is no data read/write activity for a predetermined period of time.

23. The data security system as claimed in claim 19, wherein a wireless connection includes bi-directional communication between the data security system and the wireless device.

24. The data security system as claimed in claim 19, wherein a wireless connection includes uni-directional communication between the data security system and the wireless device.

25. The data security system as claimed in claim 19, further comprising:
   an external communication channel for connection to a host computer.

* * * * *

UNITED STATES PATENT AND TRADEMARK OFFICE
CERTIFICATE OF CORRECTION

PATENT NO. : 10,181,055 B2
APPLICATION NO. : 14/987749
DATED : January 15, 2019
INVENTOR(S) : Bolotin et al.

Page 1 of 1

It is certified that error appears in the above-identified patent and that said Letters Patent is hereby corrected as shown below:

In the Specification

In Column 8, Line 39, after "device", insert --.--

In Column 8, Line 47, after "Read-Only", insert --.--

In Column 9, Line 3, after "geo-fencing)", insert --.--

In Column 9, Line 6, after "zones", insert --.--

In Column 9, Line 26, delete "628" and insert --626-- therefor

In Column 10, Line 46, delete "administrat'r's" and insert --administrator's-- therefor In Column 10, Line 61, delete "smoothes" and insert --smooths-- therefor Signed and Sealed this
Seventeenth Day of March, 2020

Andrei Iancu
*Director of the United States Patent and Trademark Office*